(No Model.)
G. MACOMBER.
FIRE EXTINGUISHER.
No. 305,088. Patented Sept. 16, 1884.
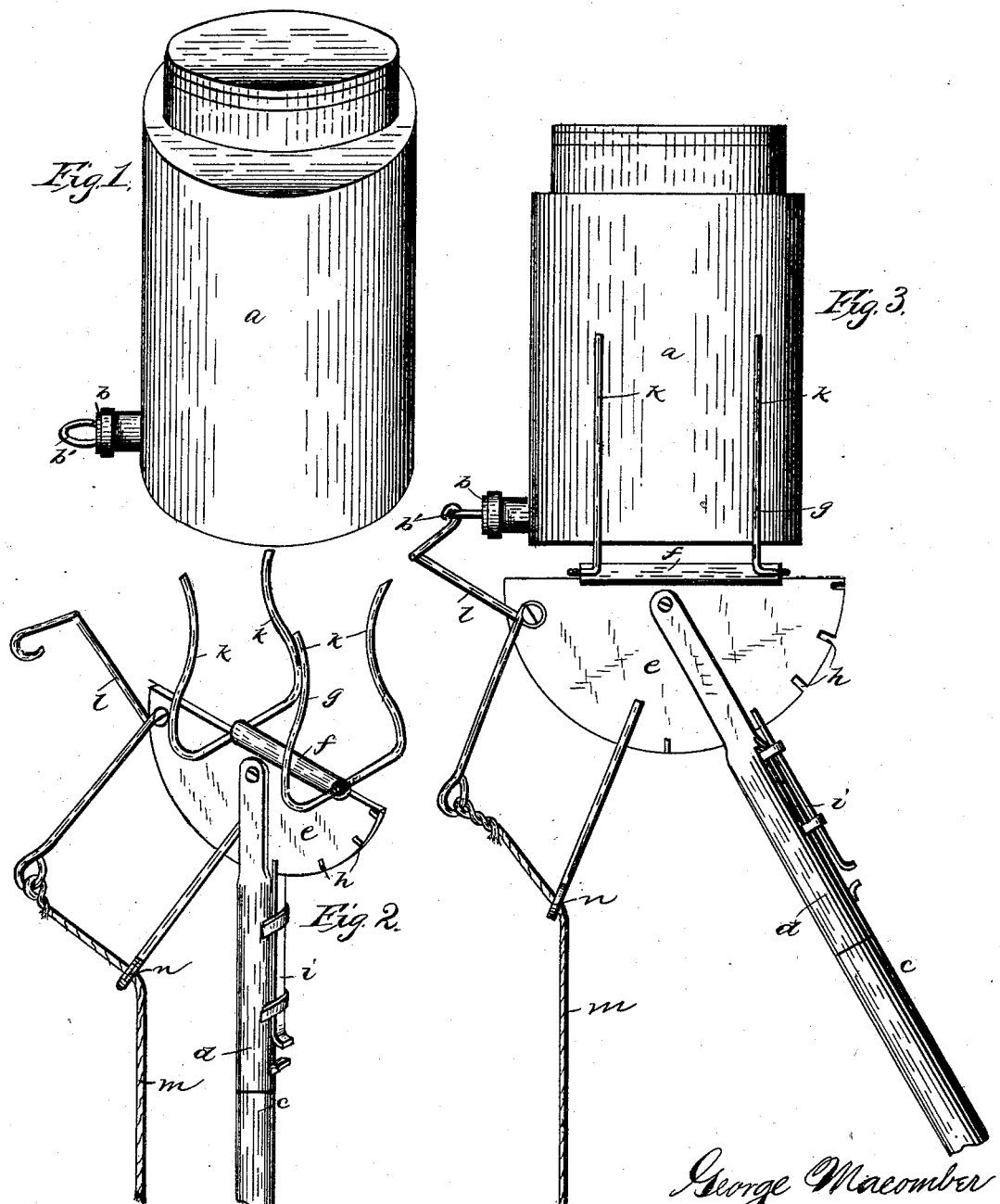
WITNESSES
F. L. Ourand
E. G. Siggers
George Macomber
INVENTOR
by C. A. Snow & Co.
Attorneys.

UNITED STATES PATENT OFFICE.

GEORGE MACOMBER, OF CLARINDA, IOWA.

FIRE-EXTINGUISHER.

SPECIFICATION forming part of Letters Patent No. 305,088, dated September 16, 1884.

Application filed March 3, 1884. (No model.)

*To all whom it may concern:*

Be it known that I, GEORGE MACOMBER, a citizen of the United States, residing at Clarinda, in the county of Page and State of Iowa, have invented a new and useful Fire-Extinguisher, of which the following is a specification, reference being had to the accompanying drawings.

This invention has relation to portable fire-extinguishers for individual and family use, and are intended for use in the early stages of a fire before it has gotten under headway; and it consists in the construction and novel arrangement of parts, as will be hereinafter fully described, and particularly pointed out in the claims appended.

Figure 1 is a perspective view of the jar that contains the fluid for extinguishing the flames. Fig. 2 is a view in perspective of the basket for holding the jar, the handle for directing and manipulating it, and the mechanism for withdrawing the plug from the jar, to permit its contents to be discharged upon the flames; and Fig. 3 is a detail view showing the handle and basket at a different angle of adjustment from that shown in Fig. 2.

Referring by letter to the accompanying drawings, $a$ designates a small jar of a size that may be conveniently handled by a single individual when in place in the apparatus hereinafter described, in which is placed a quantity of carbonic-acid gas, (soda and acid,) which is known to possess qualities that will rapidly and effectually extinguish flame. This jar is properly sealed, and is provided near its lower end or base with a plug, $b$, provided at its outer end with a loop, $b'$, for a purpose hereinafter explained.

$c$ designates a wooden handle of any desired length—for instance, of a length that may enable the operator to reach to the second floor of a building, or from the second floor to the roof, or of any convenient length—provided at its upper end with a bifurcated metal socket, $d$, in which is pivoted a semicircular bracket, $e$, upon which the bottom piece, $f$, of the basket $g$ is rigidly secured. The bracket $e$ is provided with notches $h$, which are engaged by a slide, $i$, on the socket $d$, to hold the basket $g$ in any position to which it may have been adjusted, so that the jar, when in place, may be properly presented to the fire, no matter where it may be located. The jar is held in place in the basket by four vertical curved arms, $k\ k\ k\ k$, rising from the bottom piece, $f$, of the same, as shown. An angle-lever, $l$, is fulcrumed to the semicircular bracket $e$, near one edge thereof, its weight end extending up through the loop $b'$ of the plug $b$ when the jar is in place in the basket. The lower end of the lever $l$ is provided with a cord, $m$, which runs through an eye, $n$, at the outer end of an arm on the bracket $e$, and extends along down the handle to the hands of the operator. A chain is preferable to a cord, as it is not endangered by the flames. By drawing on the cord or chain the lever will withdraw the plug from the jar, and the carbonic-acid gas will be discharged upon the flames, thereby extinguishing them if the extinguisher is brought into use before the fire gets too much headway.

Having thus fully described my invention, what I claim as new, and desire to secure by Letters Patent of the United States, is—

1. In a portable fire-extinguisher, the combination, with the jar having a plug near its base provided with a loop, of a supporting device for the jar, secured to an elongated handle, and provided with an angle-lever, and an operating-cord for withdrawing the plug from the jar, substantially as specified.

2. In a portable fire-extinguisher, the combination, with the wooden handle having the bifurcated socket at its upper end, of the basket secured to the semicircular bracket pivoted in the bifurcation of the socket, and having notches near one edge, the angle-lever fulcrumed to the semicircular bracket, and provided with the tripping-cord, and the slide for engaging the semicircular bracket, whereby the basket may be adjusted on the handle to any angle desired and the cord pulled to operate the lever to withdraw the plug, substantially as specified.

In testimony that I claim the foregoing as my own I have hereto affixed my signature in presence of two witnesses.

GEORGE MACOMBER.

Witnesses:
 S. WEST,
 W. KLLEE.